(12) United States Patent
Funatsu

(10) Patent No.: US 12,501,143 B2
(45) Date of Patent: Dec. 16, 2025

(54) IMAGE CAPTURE APPARATUS, CONTROL METHOD FOR THE SAME, AND NON-TRANSITORY COMPUTER-READABLE STORAGE MEDIUM

(71) Applicant: CANON KABUSHIKI KAISHA, Tokyo (JP)

(72) Inventor: Yoshihiro Funatsu, Hyogo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 18/665,670

(22) Filed: May 16, 2024

(65) Prior Publication Data

US 2024/0397191 A1 Nov. 28, 2024

(30) Foreign Application Priority Data

May 25, 2023 (JP) ................................ 2023-086425

(51) Int. Cl.
*H04N 23/611* (2023.01)
*H04N 23/63* (2023.01)
*H04N 23/67* (2023.01)

(52) U.S. Cl.
CPC ......... *H04N 23/611* (2023.01); *H04N 23/635* (2023.01); *H04N 23/675* (2023.01)

(58) Field of Classification Search
CPC .... H04N 23/611; H04N 23/635; H04N 23/69; H04N 23/61; H04N 23/675
USPC ....................................................... 348/345
See application file for complete search history.

(56) References Cited

U.S. PATENT DOCUMENTS

| | | | |
|---|---|---|---|
| 8,643,740 B2 * | 2/2014 | Fukata | H04N 23/611 348/222.1 |
| 10,306,131 B2 * | 5/2019 | Yokozeki | H04N 23/611 |
| 11,431,893 B2 * | 8/2022 | Okamoto | H04N 23/675 |
| 11,463,615 B2 * | 10/2022 | Kasugai | H04N 23/633 |
| 11,704,358 B2 * | 7/2023 | Bedi | G06V 20/20 707/722 |
| 12,120,420 B2 * | 10/2024 | Sato | H04N 23/635 |
| 12,142,019 B2 * | 11/2024 | Tsuji | G06V 20/60 |
| 12,342,080 B2 * | 6/2025 | Lin | G06F 3/03545 |
| 2012/0002067 A1 * | 1/2012 | Fukata | G06T 7/74 348/222.1 |

(Continued)

FOREIGN PATENT DOCUMENTS

JP 2010230871 A 10/2010
JP 2016142779 A 8/2016

*Primary Examiner* — Pritham D Prabhakher
(74) *Attorney, Agent, or Firm* — Cowan, Liebowitz & Latman, P.C.

(57) ABSTRACT

An image capture apparatus comprising: a recognition unit recognizing a person as a main subject and an object that is not a person as a secondary subject from an image; and a control unit controlling a display unit, according to a result of recognition performed by the recognition unit, wherein in a case of a first mode, the control unit displays, an image in which a focus display indicating a focus target is composited on the image obtained by the image capture unit, regardless of which of the main subject and the secondary subject is in focus, and in a case of a second mode, the control unit displays, an image in which the focus display is not composited in a case where the main subject is in focus and in which the focus display is composited in a case where the secondary subject is in focus.

8 Claims, 10 Drawing Sheets

(56) References Cited

U.S. PATENT DOCUMENTS

| | | | | |
|---|---|---|---|---|
| 2016/0295100 A1* | 10/2016 | Yokozeki | ............ | H04N 23/635 |
| 2017/0026565 A1* | 1/2017 | Hong | ................... | G06V 40/161 |
| 2018/0106982 A1* | 4/2018 | Uemura | ............. | H04N 23/675 |
| 2020/0296279 A1* | 9/2020 | Kasugai | ............... | H04N 23/667 |
| 2021/0281733 A1* | 9/2021 | Yamanaka | .......... | H04N 23/632 |
| 2021/0321034 A1* | 10/2021 | Okamoto | ............ | H04N 23/611 |
| 2022/0321782 A1* | 10/2022 | Hongu | ................. | H04N 23/675 |
| 2023/0300453 A1* | 9/2023 | Seki | ..................... | H04N 23/611 |
| | | | | 348/49 |
| 2024/0365005 A1* | 10/2024 | Lin | ..................... | H04N 23/695 |

\* cited by examiner

START SHOOTING (MAIN SUBJECT)

START PRODUCT REVIEW (SECONDARY SUBJECT)

START PRODUCT REVIEW (SECONDARY SUBJECT UNDETECTED)

FIG. 4A

IMAGE CAPTURE APPARATUS, CONTROL METHOD FOR THE SAME, AND NON-TRANSITORY COMPUTER-READABLE STORAGE MEDIUM

BACKGROUND OF THE INVENTION

Field of the Invention

The present invention relates to an image capture apparatus, a control method for the same, and a non-transitory computer-readable storage medium.

Description of the Related Art

In recent years, opportunities to shoot moving images and the number of creators have increased, and shooting of vlogs, in which daily life is recorded, is attracting attention. Among these, there is also product review shooting in which a cameraman holds a specific object (e.g., a product) and describes features and the appeal of that object, and some cameras are also equipped with a review shooting mode. When operating in the review shooting mode, this camera performs control for, if an object to be introduced is located relative to the photographer, focusing on the object, and if not, focusing on a person, and thus an improvement in the quality of the moving image is achieved.

As a similar prior technique, Japanese Patent Laid-Open No. 2010-230871 proposes a technique in which a photographer is assisted by searching and displaying the next target to focus on when shooting a large number of subjects. For this reason, subject information is registered in the camera in advance. The camera includes a mode in which an AF frame is displayed and AF is performed on a registered subject, and a face detection mode in which the AF frame and at least one name frame of the subject are merely displayed and AF frame tracking is not performed.

Japanese Patent Laid-Open No. 2016-142779 also discloses a camera that, when a user selects a subject on a screen displayed on a display unit of the camera, displays the amount of defocus between the current focus position and the focus position of the selected subject, and displays where the current focus position is on a defocus display.

Regarding the above-mentioned background art, there are the following two issues in performing review shooting. The first problem is that when the distance between the photographer and the monitor becomes relatively large, it becomes difficult for the photographer to check whether he or she (the photographer) or the object (the review target) is in focus.

The second issue is that although the photographer wants to check the expression of the photographer and how the review target looks, visibility of the state of the subject is impaired by constantly displaying a frame around the subject that is in focus. There is demand to solve the above problems and improve the coexistence of focus display and object visibility. Furthermore, many known product specifications do not perform focus display during a review mode in order to give priority to the solution to the second issue.

SUMMARY OF THE INVENTION

The present invention has been made in view of the above-described problems, and aims to provide a technique that realizes comfortable operability in review mode shooting.

According to one aspect of the present invention, there is provided an image capture apparatus comprising: at least one processor and/or circuit configured to function as the following units: a recognition unit configured to recognize a person as a main subject and an object that is not a person as a secondary subject from an image obtained by an image capture unit configured to capture an image of a subject; and a control unit configured to control a display unit configured to display the image captured by the image capture unit, according to a result of recognition performed by the recognition unit, wherein in a case where a first mode is selected, the control unit displays, on the display unit, an image in which a focus display indicating a focus target is composited on the image obtained by the image capture unit, regardless of which of the main subject and the secondary subject is in focus, and in a case where a second mode is selected, the control unit displays, on the display unit, an image in which the focus display is not composited in a case where the main subject is in focus and in which the focus display is composited in a case where the secondary subject is in focus.

According to another aspect of the present invention, there is provided a control method for an image capture apparatus, comprising: recognizing a person as a main subject and an object that is not a person as a secondary subject from an image obtained by an image capture unit configured to capture an image of a subject; and controlling a display unit configured to display the image captured by the image capture unit, according to a result of recognition performed in the recognition, wherein in the controlling, in a case where a first mode is selected, an image in which a focus display indicating a focus target is composited on the image obtained by the image capture unit is displayed on the display unit, regardless of which of the main subject and the secondary subject is in focus, and in a case where a second mode is selected, an image in which the focus display is not composited in a case where the main subject is in focus and in which the focus display is composited in a case where the secondary subject is in focus is displayed on the display unit.

According to another aspect of the present invention, there is provided a non-transitory computer-readable storage medium storing a computer program that, due to being read out and executed by a computer of an image capture apparatus, causes the computer to: recognize a person as a main subject and an object that is not a person as a secondary subject from an image obtained by an image capture unit configured to capture an image of a subject; and control a display unit configured to display the image captured by the image capture unit, according to a result of recognition performed in the recognition, wherein in the control of the display unit, in a case where a first mode is selected, an image in which a focus display indicating a focus target is composited on the image obtained by the image capture unit is displayed on the display unit, regardless of which of the main subject and the secondary subject is in focus, and in a case where a second mode is selected, an image in which the focus display is not composited in a case where the main subject is in focus and in which the focus display is composited in a case where the secondary subject is in focus is displayed on the display unit.

Further features of the present invention will become apparent from the following description of exemplary embodiments (with reference to the attached drawings).

BRIEF DESCRIPTION OF THE DRAWINGS

FIG. 4A is a first part of a transition diagram of a display screen according to the first embodiment.

DESCRIPTION OF THE EMBODIMENTS

Figure 1A:
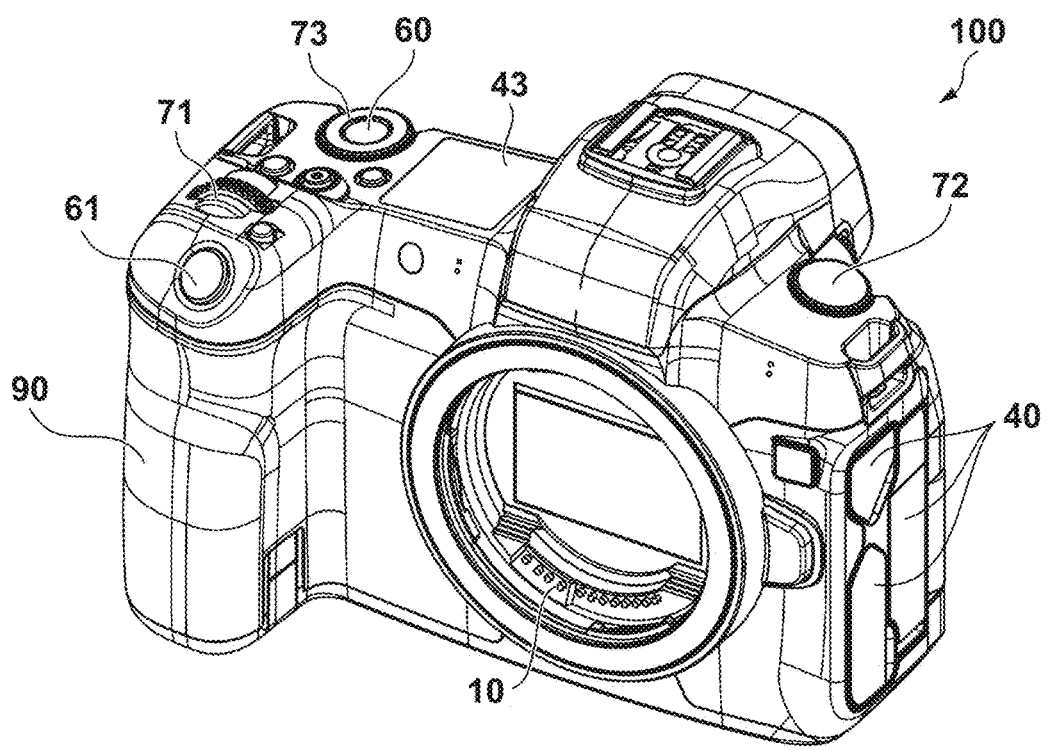
FIG. 1A is a front perspective view showing an outer appearance of a configuration of a digital camera according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1B:
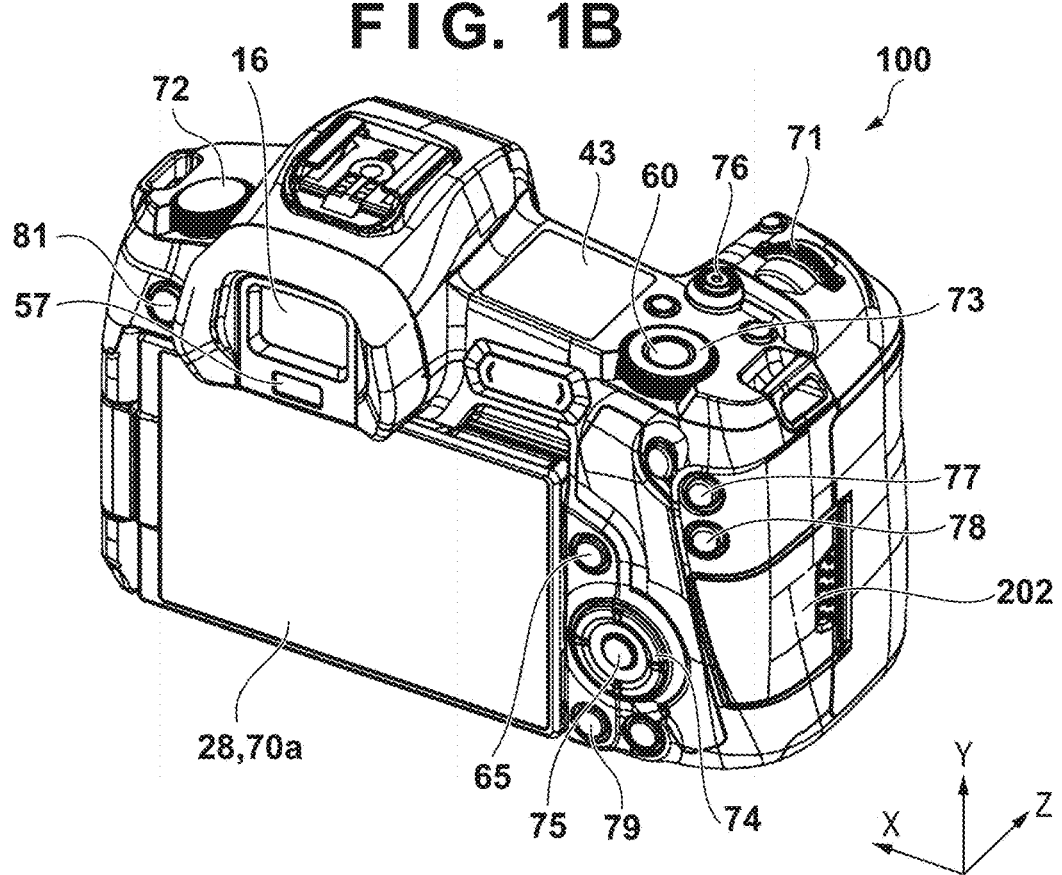
FIG. 1B is a rear perspective view showing the external appearance of the configuration of the digital camera according to the first embodiment.

Hereinafter, a preferred first embodiment of the present invention will be described with reference to the drawings. FIGS. 1A and 1B show external views of a digital camera 100 capable of shooting and recording still images and moving images, as an example of an apparatus to which this embodiment is applicable. The digital camera 100 is an example of an image capture apparatus. FIG. 1A is a front perspective view of the digital camera 100, and FIG. 1B is a rear perspective view of the digital camera 100. In FIGS. 1A and 1B, a display unit 28 is a display unit provided on the back of the camera that displays images and various types of information. A touch panel 70a can detect a touch operation on the display surface (operation surface) of the display unit 28. A viewfinder-external display unit 43 is a display unit provided on the top surface of the camera, and displays various setting values of the camera, such as shutter speed and aperture.

A shutter button 61 is an operation portion for instructing shooting. A mode switching switch 60 is an operation portion for switching between various modes. Terminal covers 40 are covers that protect connectors (not shown) that connect connection cables connected to external devices and the digital camera 100. A main electronic dial 71 is a rotary operation member included in an operation unit 70, and by rotating the main electronic dial 71, changing of setting values such as shutter speed and aperture and the like can be performed.

A power source switch 72 is an operation member for switching the power source of the digital camera 100 on and off. A sub electronic dial 73 is a rotary operation member included in the operation unit 70, and can move a selection frame, advance images, and the like. A cross key 74 is a cross key operation member (four-way key) that is included in the operation unit 70 and has push buttons that can be pushed in four directions, such as the upper, lower, left, and right portions. Operations can be performed according to the portion of the cross key 74 pressed in the pressed direction.

A SET button 75 is included in the operation unit 70, is a push button, and is mainly used for determining a selection item, and the like. A moving image button 76 is used to instruct the start and stop of moving image shooting (recording). An AE lock button 77 is included in the operation unit 70, and by pressing the AE lock button 77 in a shooting standby state, an exposure state can be fixed. A magnification button 78 is included in the operation unit 70 and is an operation button for switching a magnification mode on and off in live view display in the shooting mode.

By operating the main electronic dial 71 after turning on the magnification mode, the live view image can be magnified or scaled down. In a playback mode, the main electronic dial 71 functions as a magnification button for magnifying the playback image and increasing the magnification factor. A playback button 79 is included in the operation unit 70 and is an operation button for switching between the shooting mode and the playback mode. By pressing the playback button 79 during the shooting mode, the mode transitions to the playback mode, and the most recent image among the images recorded in a recording medium 200 can be displayed on the display unit 28.

A menu button 81 is included in the operation unit 70, and when pressed, a menu screen on which various settings can be performed is displayed on the display unit 28. The user can intuitively perform various settings using the menu screen displayed on the display unit 28, and the cross key 74, the SET button 75, or a multi-controller (hereinafter referred to as "MC") 65. The MC 65 can accept direction instructions in eight directions and a push operation in the center.

A communication terminal 10 is a communication terminal through which the digital camera 100 communicates with a lens unit 150 (attachable and detachable), which will be described later. An eyepiece portion 16 is an eyepiece portion of an ocular viewfinder (a look-in-type viewfinder), and the user can view an image displayed on an internal electric view finder (EVF) 29 through the eyepiece portion 16. An eye approach detection unit 57 is an eye approach detection sensor that detects whether or not an eye of the photographer has approached the eyepiece portion 16. A lid 202 is a lid for a slot in which the recording medium 200 is stored.

A grip portion 90 is a holding portion shaped so as to be easily grasped with the right hand when the user holds the digital camera 100. The shutter button 61 and the main electronic dial 71 are arranged at positions where they can be operated with the index finger of the right hand when the user holds the digital camera by gripping the grip portion 90 with the little finger, ring finger, and middle finger of the right hand. Also, the sub electronic dial 73 is arranged at a position that can be operated by the user with the thumb of the right hand in the same state.

Figure 2:
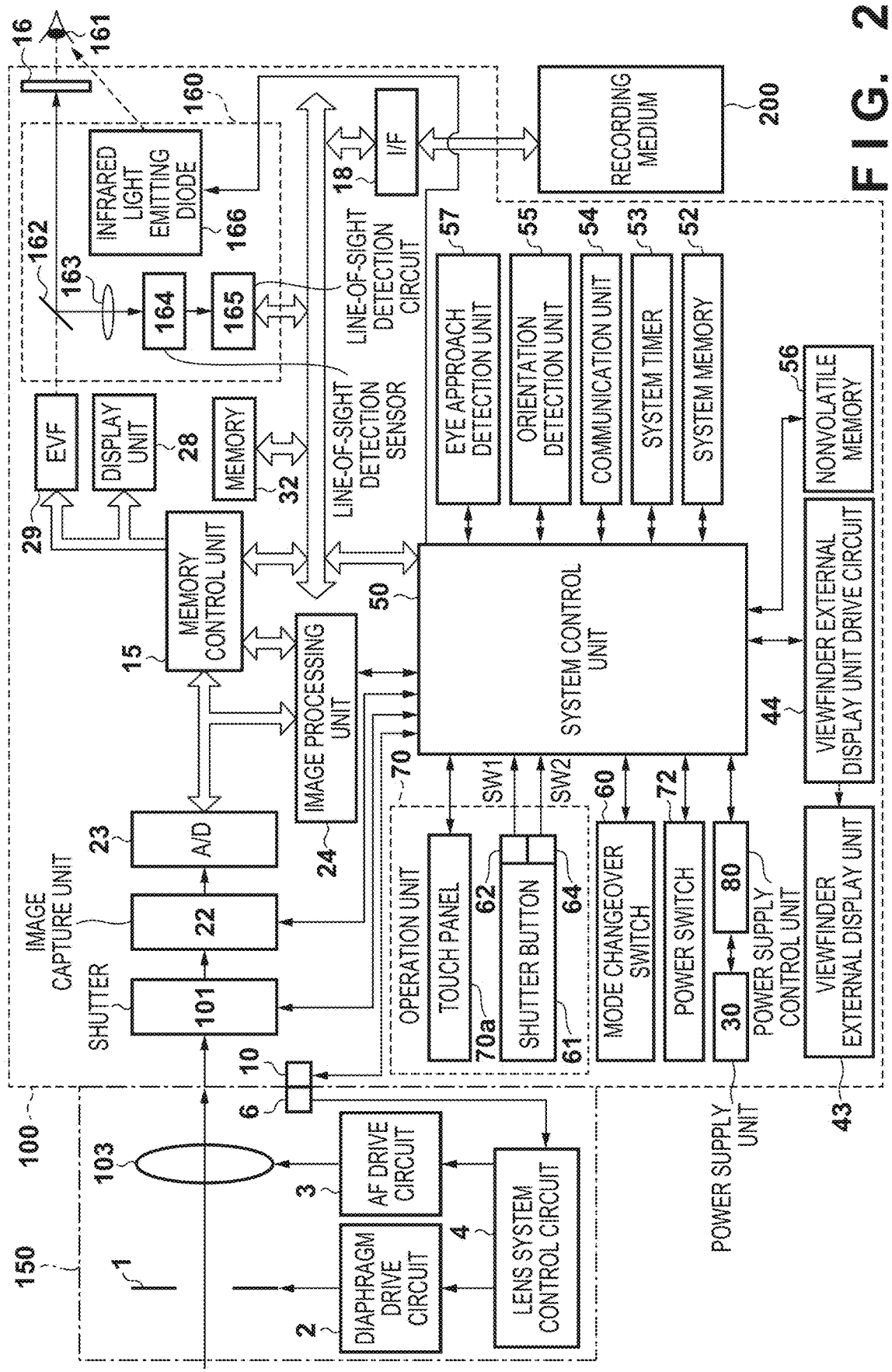
FIG. 2 is a block configuration diagram of the digital camera according to the first embodiment.

FIG. 2 is a block diagram showing a configuration example of the digital camera 100 according to this embodiment. In FIG. 2, a lens unit 150 is a lens unit equipped with an exchangeable photographic lens. Although a lens 103 is usually constituted by a plurality of lenses, only one lens is shown here for simplicity. A communication terminal 6 is a communication terminal through which the lens unit 150 communicates with the digital camera 100. The lens unit 150 communicates with a system control unit 50 via this communication terminal 6 and the above-mentioned communication terminal 10, and controls a diaphragm 1 via a diaphragm drive circuit 2, using an internal lens system control circuit 4. Thereafter, the lens unit 150 performs focusing by displacing the lens 103 via an AF drive circuit 3, using a lens system control circuit 4.

A shutter 101 is a focal plane shutter that can freely control the exposure time of an image capture unit 22 under the control of the system control unit 50.

The image capture unit 22 is an image capture element constituted by a CCD, a CMOS element, or the like that converts an optical signal of an optical image taken in through a lens into an electrical signal. An A/D converter 23 is used to convert an analog signal output from the image capture unit 22 into a digital signal.

An image processing unit 24 performs predetermined resizing processing such as pixel interpolation and scaling-down, and color conversion processing on data from the A/D converter 23 or data from a memory control unit 15, which will be described later. Also, the image processing unit 24 performs predetermined computation processing using the captured image data. Based on the computation results obtained by the image processing unit 24, the system control unit 50 performs exposure control and distance measurement control. Accordingly, through-the-lens (TTL)-based autofocus (AF) processing, autoexposure (AE) processing, and flash pre-emission (EF) processing are performed. The image processing unit 24 further performs predetermined computation processing using the captured image data, and performs TTL-based auto white balance (AWB) processing based on the obtained computation results.

The memory control unit 15 controls data transmission and reception between the A/D converter 23, the image processing unit 24, and a memory 32. Output data from the A/D converter 23 is directly written into the memory 32 via the image processing unit 24 and the memory control unit 15, or via the memory control unit 15. The memory 32 stores image data obtained by the image capture unit 22 and converted into digital data by the A/D converter 23, and image data to be displayed on the display unit 28 and the EVF 29. The memory 32 has a storage capacity sufficient to store a predetermined number of still images, and moving images and audio of a predetermined amount of time.

The memory 32 also serves as an image display memory (video memory). The display image data written in the memory 32 is displayed by the display unit 28 and the EVF 29 via the memory control unit 15. The display unit 28 and the EVF 29 perform display on a display such as an LCD or organic EL according to a signal from the memory control unit 15. Live view display (LV display) can be performed by sequentially transferring and displaying data A/D converted by the A/D converter 23 and stored in the memory 32 to the display unit 28 or the EVF 29. Hereinafter, an image to be displayed in live view will be referred to as a live view image (LV image).

An infrared light emitting diode 166 is a light emitting element for detecting the line-of-sight position of the user within the viewfinder screen, and irradiates an eyeball (eye) 161 of the user that has approached the eyepiece portion 16 with infrared light. The infrared light emitted from the infrared light emitting diode 166 is reflected by the eyeball (eye) 161, and the infrared reflected light reaches a dichroic mirror 162. The dichroic mirror 162 reflects only infrared light and allows visible light to pass through. The infrared reflected light whose optical path has been changed forms an image on an image capture surface of a line-of-sight detection sensor 164 via an image forming lens 163. The image forming lens 163 is an optical member that forms a line-of-sight detection optical system. A line-of-sight detection sensor 164 is constituted by an image capture device such as a CCD-type image sensor.

The line-of-sight detection sensor 164 photoelectrically converts the incident infrared reflected light into an electrical signal and outputs the resulting electrical signal to a line-of-sight detection circuit 165. The line-of-sight detection circuit 165 includes at least one processor, detects the line-of-sight position of the user from the image or movement of the user's eyeball (eye) 161 based on the output signal of the line-of-sight detection sensor 164, and outputs the detected information to the system control unit 50. In this way, a line-of-sight detection block 160 is constituted by the dichroic mirror 162, the image forming lens 163, the line-of-sight detection sensor 164, the infrared light emitting diode 166, and the line-of-sight detection circuit 165.

The line-of-sight detection block 160 of this embodiment detects the line of sight of the user using a method called the corneal reflection method. The corneal reflection method is a method of detecting the direction and position of a line of sight based on the positional relationship between reflected light, which is obtained by infrared light emitted from the infrared light emitting diode 166 being reflected by the cornea of the eyeball (eye) 161, and the pupil of the eyeball (eye) 161. In addition, there are various methods for detecting the direction and position of the line of sight, such as a method called the scleral reflection method, which utilizes the difference in light reflectivity between the pupil and the white of the eye. It should be noted that any other method of line-of-sight detection unit than the above may be used, as long as it is capable of detecting the direction and position of the line of sight.

Various setting values of the camera, including the shutter speed and aperture, are displayed on the viewfinder-external display unit 43 via a viewfinder-external display unit drive circuit 44.

A nonvolatile memory 56 is an electrically erasable/recordable memory, such as a Flash-ROM. The nonvolatile memory 56 stores constants, programs, and the like for the operation of the system control unit 50. A program here refers to a computer program for executing various flowcharts described later in this embodiment.

The system control unit 50 is a control unit constituted by at least one processor or circuit, and performs overall control of the digital camera 100. The processor may be, for example, a central processing unit (CPU), a micro processing unit (MPU), a graphics processing unit (GPU), a quantum processing unit (QPU), or a combination thereof.

The system control unit 50 executes the programs recorded in the nonvolatile memory 56 described above to realize each processing of the present embodiment, which will be described later. For example, a RAM is used as a system memory 52, and constants and variables for the operation of the system control unit 50, programs read out from the nonvolatile memory 56, and the like are loaded to the system memory 52. The system control unit 50 also performs display control by controlling the memory 32, display unit 28, and the like.

The system control unit 50 switches the shooting mode based on, for example, setting information set by the user. The shooting mode includes, for example, a normal mode in which an image in which a focus display indicating a focus target, which is a target to be focused on, is composited regardless of the subject is displayed, and a review mode in which, if a person is in focus, an image is displayed without compositing a focus display, and if an object such as a product, which is not a person, is in focus, an image in which a focus display is composited is displayed. The review mode is, for example, a product introduction mode for introducing a product. The normal mode is an example of a first mode, and the review mode is an example of a second mode.

A system timer 53 is a time measurement unit that measures the time used for various controls and the time of a built-in clock.

The mode switching switch 60, a first shutter switch 62, a second shutter switch 64, and the operation unit 70 are operation unit for inputting various operation instructions to the system control unit 50. The mode switching switch 60 switches the operation mode of the system control unit 50 to one of a still image shooting mode, a moving image shooting mode, and the like. Modes included in the still image shooting mode include an auto shooting mode, an auto scene determination mode, a manual mode, an aperture priority mode (Av mode), a shutter speed priority mode (Tv mode), and program AE mode (P mode). Also, there are various scene modes, custom modes, and the like, which are shooting settings for each shooting scene. The mode switching switch 60 allows the user to switch directly to any of these modes. Alternatively, after once switching to a screen showing a list of shooting modes using the mode switching switch 60, one of the displayed plurality of modes may also be selected and switched to using another operation member. Similarly, the moving image shooting mode may also include a plurality of modes.

The first shutter switch 62 is turned on when the shutter button 61 provided on the digital camera 100 is partially operated, or a so-called half-press (shooting preparation instruction) is performed, and the first shutter switch 62 generates a first shutter switch signal SW1. According to the first shutter switch signal SW1, shooting preparation operations such as autofocus (AF) processing, automatic exposure (AE) processing, auto white balance (AWB) processing, and flash pre-emission (EF) processing are started.

The second shutter switch 64 is turned on when the operation of the shutter button 61 is completed, or a so-called full press (shooting instruction) is performed, and the second shutter switch 64 generates a second shutter switch signal SW2. According to the second shutter switch signal SW2, the system control unit 50 starts a series of operations of shooting processing from reading out the signal from the image capture unit 22 to writing the captured image into the recording medium 200 as an image file.

The operation unit 70 is various operation members serving as an input unit that accepts operations from the user. The operation unit 70 includes at least the following operation units: the shutter button 61, the multi-controller 65, the touch panel 70a, the main electronic dial 71, the power source switch 72, the sub electronic dial 73, the cross key 74, the SET button 75, the moving image button 76, the AE lock button 77, the magnification button 78, the playback button 79, and the menu button 81.

The power supply control unit 80 is constituted by a battery detection circuit, a DC-DC converter, a switch circuit for switching blocks through which current is to flow, and the like, and detects whether or not a battery is attached, the type of battery, and the remaining battery level. Also, the power supply control unit 80 controls the DC-DC converter based on the detection result and the instruction from the system control unit 50, and supplies the necessary voltage to each unit including the recording medium 200 for a necessary period. The power supply unit 30 includes a primary battery such as an alkaline battery or a lithium battery, a secondary battery such as a NiCd battery, a NiMH battery, or a Li battery, an AC adapter, and the like.

A recording medium I/F 18 is an interface with the recording medium 200 such as a memory card or a hard disk. The recording medium 200 is a recording medium such as a memory card for recording shot images, and is constituted by a semiconductor memory, a magnetic disk, or the like.

A communication unit 54 is connected wirelessly or by a wired cable and transmits and receives image signals and audio signals. The communication unit 54 can also be connected to a wireless LAN (Local Area Network) and the Internet. Also, the communication unit 54 can communicate with external devices using Bluetooth (registered trademark) or Bluetooth Low Energy. The communication unit 54 can transmit images captured by the image capture unit 22 (including live view images) and images recorded in the recording medium 200, and can also receive images and other various types of information from an external device.

An orientation detection unit 55 detects the orientation of the digital camera 100 with respect to the direction of gravity. Based on the orientation detected by the orientation detection unit 55, it is possible to determine whether the image shot by the image capture unit 22 is an image shot with the digital camera 100 held horizontally or an image shot with the digital camera 100 held vertically. The system control unit 50 can add direction information according to the orientation detected by the orientation detection unit 55 to the image file of the image captured by the image capture unit 22, or can rotate and record the image. As the orientation detection unit 55, an acceleration sensor, a gyro sensor, or the like can be used. It is also possible to detect movement of the digital camera 100 (panning, tilting, lifting, whether or not it is stationary, etc.) using an acceleration sensor or a gyro sensor, which is the orientation detection unit 55.

The eye approach detection unit 57 is an eye approach detection sensor that performs detection (approach detection) of the approach (eye approach) or separation (eye separation) of the eye (object) 161 to or from the eyepiece portion 16 of the viewfinder. The system control unit 50 switches the display unit 28 and the EVF 29 between display (display state) and non-display (non-display state) according to the state detected by the eye approach detection unit 57. More specifically, if at least the digital camera 100 is in a shooting standby state and the setting for switching the display destination of the live view image captured by the image capture unit 22 is an automatic switching setting, while the eye is separated from the viewfinder, display is turned on with the display unit 28 as the display destination, and the EVF 29 is not displayed. Also, during eye approach, display is turned on with the EVF 29 as the display destination, and the display unit 28 is not displayed. The eye approach detection unit 57 can use, for example, an infrared proximity sensor, and can detect the approach of some object to the eyepiece portion 16 of the viewfinder including the EVF 29. When an object approaches, infrared light projected from a light projecting portion (not shown) of the eye approach detection unit 57 is reflected and received by a light receiving portion (not shown) of the infrared proximity sensor. Depending on the amount of infrared rays received, it is also possible to determine how close the object is to the eyepiece portion 16 (eye approach distance).

In this way, the eye approach detection unit 57 performs eye approach detection to detect the proximity distance of an object to the eyepiece portion 16. Note that in this embodiment, it is assumed that the light emitting portion and the light receiving portion of the eye approach detection unit 57 are separate devices from the above-mentioned infrared light emitting diode 166 and line-of-sight detection sensor 164. However, the infrared light emitting diode 166 may also serve as the light projecting unit of the eye approach detection unit 57. In addition, the line-of-sight detection sensor 164 may also serve as the light receiving portion. When an object approaching the eyepiece portion 16 by a predetermined distance or less is detected from a non-eye-approach state (non-approaching state), it is determined that eye approach has occurred. If the object whose approach was detected moves away from the eyepiece by a predetermined distance or more from an eye-approach state (approaching state), it is determined that eye separation has occurred. The threshold value for detecting eye approach and the threshold value for detecting eye separation may be different due to providing hysteresis, for example. Also, after eye approach is detected, it is assumed that the eye-approach state continues until eye separation is detected. After eye separation is detected, it is assumed that the non-eye-approach state continues until eye approach is detected. Note that the infrared proximity sensor is one example, and other sensors may also be used for the eye approach detection unit 57 as long as they can detect the approach of an eye or an object that can be regarded as eye approach.

The system control unit 50 can detect the following operations or states based on the output from the line-of-sight detection block 160.

The approach of the user's eye to the eyepiece portion 16 being detected for the first time (start of line-of-sight input).

The user's eye continuing to be near the eyepiece portion 16 (user line-of-sight input state).

The user looking into the eyepiece portion 16.

From the eyepiece portion 16, the user's eye changing from a close state to a non-detection state (end of line-of-sight input).

The user's eye continuing not to be detected at the eyepiece portion 16 (a state in which the user does not input any line-of-sight).

"Look into" mentioned here refers to the user's line-of-sight position being within a preset range for a predetermined period of time.

The touch panel 70*a* and the display unit 28 can be formed in one piece. For example, the touch panel 70*a* is configured such that its light transmittance does not interfere with the display on the display unit 28, and is attached to the upper layer of the display surface of the display unit 28. Also, the input coordinates on the touch panel 70*a* are associated with the display coordinates on the display screen of the display unit 28. As a result, it is possible to provide a GUI (graphical user interface) that makes it seem as if the user can directly operate the screen displayed on the display unit 28. The system control unit 50 can detect the following operations or states on the touch panel 70*a*.

A finger or pen that was not touching the touch panel 70*a* touching the touch panel 70*a* for the first time. That is, the start of a touch (hereinafter referred to as touch-down).

Touching the touch panel 70*a* with a finger or pen (hereinafter referred to as touch-on).

Moving a finger or pen while touching the touch panel 70*a* with the finger or pen (hereinafter referred to as touch-move).

A finger or pen that was touching the touch panel 70*a* being removed from the touch panel 70*a*. That is, the end of a touch (hereinafter referred to as touch-up).

Nothing touching the touch panel 70*a* (hereinafter referred to as touch-off).

When touch-down is detected, touch-on is also detected at the same time. After touch-down, touch-on typically continues to be detected unless touch-up is detected. Touch-move is also detected in a state where touch-on is detected. Even if touch-on is detected, touch-move will not be detected unless the touch position moves. After it is detected that all fingers or pens that were touching have performed touch-up, touch-off occurs.

The system control unit 50 is notified of these operations and states, and the position coordinates touched by the finger or pen on the touch panel 70*a*, through an internal bus. The system control unit 50 determines what kind of operation (touch operation) was performed on the touch panel 70*a* based on the notified information. Regarding touch-move, the direction of movement of the finger or pen moving on the touch panel 70*a* can also be determined for each vertical component and horizontal component on the touch panel 70*a* based on changes in position coordinates. If it is detected that touch-move was performed over a predetermined distance or more, it is determined that a slide operation was performed.

An operation in which a user quickly moves a finger a certain distance while touching the touch panel and then removes the finger from the touch panel is called a flick. In other words, a flick is an operation of quickly tracing with a finger on the touch panel 70*a* as if performing a flicking motion. If touch-move performed over a predetermined distance or more and at a predetermined speed or higher is detected and touch-up is detected as-is, it can be determined that a flick has been performed (it can be determined that a flick has occurred following a slide operation).

Furthermore, a touch operation in which the user touches multiple locations (for example, two points) at the same time and moves the touch positions closer together is called a pinch-in, and a touch operation in which the user moves the touch positions away from each other is called a pinch-out. Pinch-out and pinch-in are collectively referred to as pinch operations (or simply pinches).

The touch panel 70*a* may be any of various types of touch panels such as a resistive film type, a capacitive type, a surface acoustic wave type, an infrared type, an electromagnetic induction type, an image recognition type, and an optical sensor type. Types of touch panels include a type that detects a touch when the touch panel is touched, and a type that detects a touch when a finger or pen approaches the touch panel, and in the present embodiment, either method may be adopted.

When a touch-move operation is performed in an eye-approach state, the user can set the method for designating the position of a position index corresponding to the touch-move operation to either absolute position designation or relative position designation. For example, if the position index is an AF frame and absolute position designation is set, when the touch panel 70*a* is touched, the AF position associated with the touched position (coordinate input position) is set. That is, the position coordinates where the touch operation was performed are associated with the position coordinates of the display unit 28. On the other hand, if relative position designation is set, the position coordinates where the touch operation was performed and the position coordinates of the display unit 28 are not associated with each other. In relative position designation, the touch position is moved by a distance corresponding to the touch-move movement amount in the touch-move movement direction from the currently-set AF position, regardless of the touch-down position with respect to the touch panel 70*a*.

Figure 3:
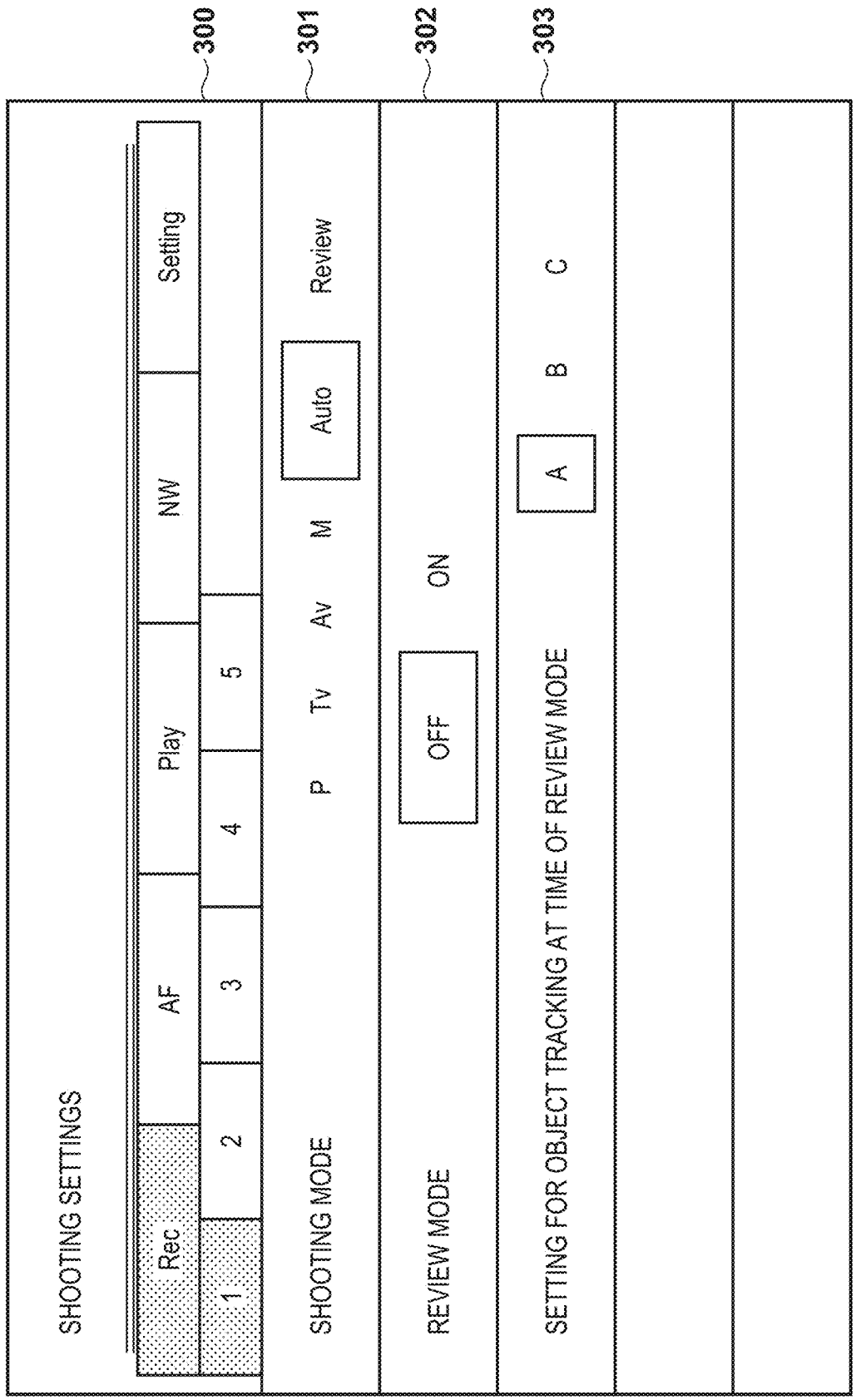
FIG. 3 is a diagram showing an example of a setting screen displayed on the digital camera according to the first embodiment.

FIG. 3 is a diagram showing a menu screen for changing settings displayed on the display unit 28 of the camera of this embodiment.

This menu screen is broadly divided into regions 300 to 303. The user selects one of the menus by touch input or by operating up/down/left/right keys and a selection key.

The region 300 includes a selected tab relating to general moving image shooting (Rec), a tab relating to autofocus (AF), and the like, and the drawing shows that general moving image shooting has been selected.

The region 301 is a region for selecting a mode during moving image shooting. In this embodiment, in addition to general P/Tv/Av/M/AUTO modes of a digital camera, a Review mode has been added as a product review mode.

The region 302 is a setting for switching product review mode on and off. This setting allows the user to set the review mode. Here, two types of setting items, namely the region 301 and the region 302, are displayed, but only one of them need be displayed.

The region 303 is the display setting for secondary subject tracking in the product review mode. Although the details will be described later with reference to FIGS. 4A and 4B, settings A, B, and C can change the display method used when tracking is performed on the screen after detecting a secondary subject. Information regarding the normal mode, review mode, and settings A to C described above is an example of setting information.

The settings of the above-described regions 301 to 303 are stored in the nonvolatile memory 56 or the like by the system control unit 50, and the system control unit 50 controls the display according to the settings.

Figure 4B:
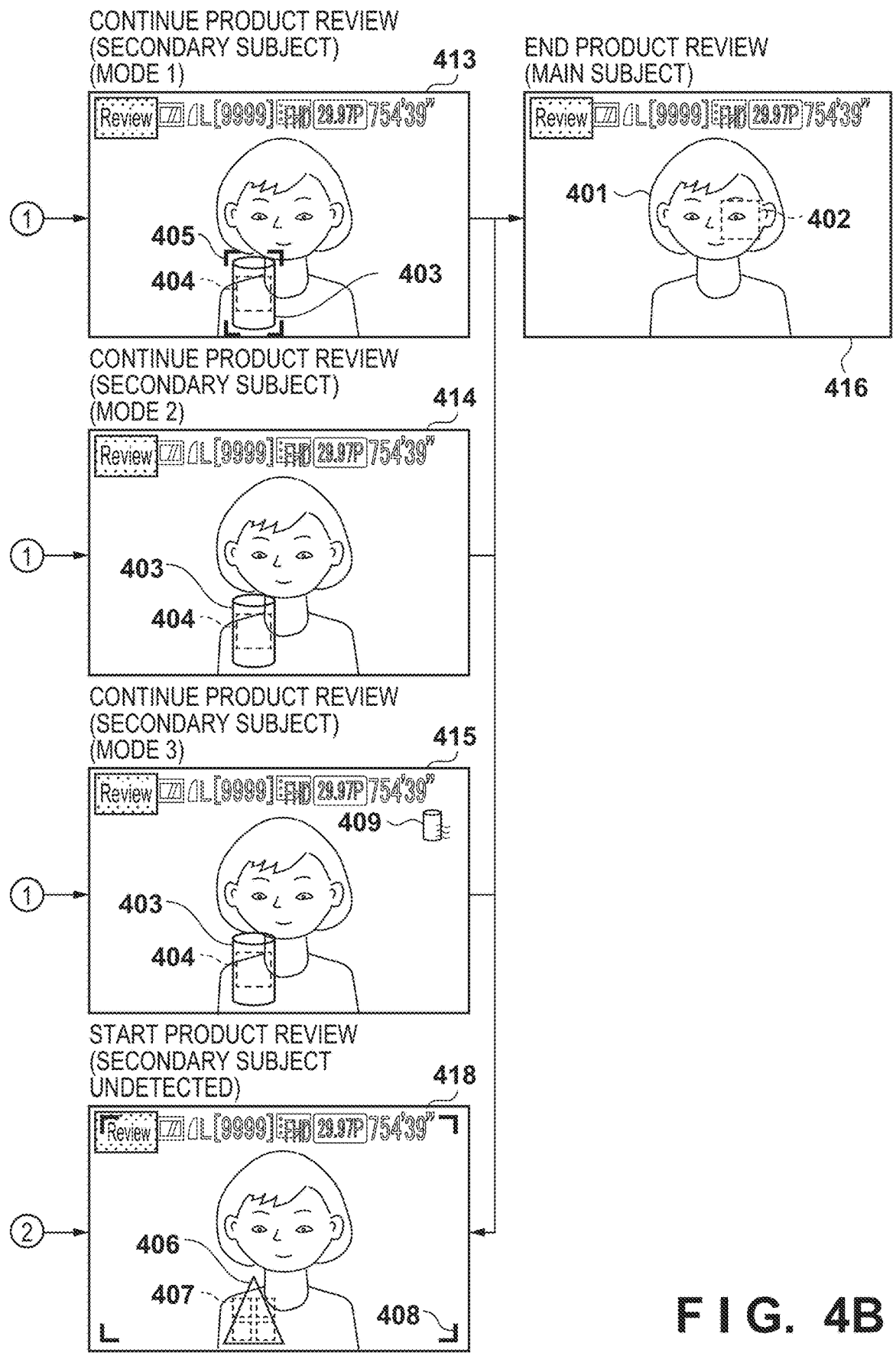
FIG. 4B is a latter part of a transition diagram of a display screen according to the first embodiment.

FIGS. 4A and 4B is a state transition diagram of the display on the display unit 28 of the camera according to the first embodiment. Hereinafter, state transitions will be described with reference to the same drawing.

Note that in order to facilitate understanding, an example will be described in which a user who is a photographer records an image introducing a product when shooting in review mode. Here, the user is a person who describes the product and is also a photographer who shoots the product. A product is a non-person object. Hereinafter, the user will be described as a main subject, and the product will be described as a secondary subject.

A state 411 is also a screen showing a state in which a photographer 401 is in focus. If the system control unit 50 does not recognize anything other than the photographer 401, it basically continues to focus on the photographer 401. Although the system control unit 50 focuses on a region 402, the frame representing the region 402 is not displayed on the screen on the display unit 28. Note that in the normal mode, the system control unit 50 displays an image by compositing a frame surrounding at least part of the focus target as a focus display, regardless of whether the photographer 401 or the review target is in focus. When the system control unit 50 recognizes a review target, the system control unit 50 transitions to a state 412. For example, the system control unit 50 recognizes, as a review target, an object that the user has registered in advance in the nonvolatile memory 56 of the digital camera 100 or the like. Note that when the system control unit 50 recognizes something other than a person, the system control unit 50 may recognize the recognized target as a review target, or may recognize the review target by the person's gesture, such as pointing at the object.

The state 412 is a state in which the system control unit 50 focuses on the review target 403 in a stationary state in response to detecting the review target 403. In other words, the system control unit 50 recognizes the photographer 401 and the review target 403, and generates an image according to the recognition result. At this time, the system control unit 50 focuses on a broken line region 404, but this broken line region 404 is not displayed. Instead, in order to make it easier for the user to understand intuitively, the system control unit 50 displays the image by compositing a frame 405 that includes the review target 403, which is the focus target being focused on, as a focus display. Note that although an example is illustrated in which, in a state 413, the frame 405 includes the entire review target 403, the system control unit 50 may also display the frame 405 surrounding at least a portion (e.g., the center) of the review target 403 as the focus display. Also, if the system control unit 50 detects movement of the review target 403, the system control unit 50 tracks the review target 403, transitions from the state 412 to the state 413, and continues display while moving the frame 405 according to the movement of the review target 403.

The states 413 to 415 are movement states when the review target 403 is moved within the angle of view. First, in the state 413, the system control unit 50 tracks the review target 403 within the screen using the same expression as in the state 412, and causes the frame 405 to follow the review target 403. Next, in the state 414, the system control unit 50 hides the display of the frame 405 while the review target 403 is moving. By hiding the frame 405, the system control unit 50 can reduce display overlap with the review target 403, and the user can easily check the subjects including the review target 403. In the state 415, the system control unit 50 expresses that the moving review target 403 is being tracked and is in focus by displaying shooting information as an icon 409 instead of hiding the fact that the moving review target 403 is in focus. As described above, the system control unit 50 may also detect the movement of the review target 403 and devise a frame expression that indicates that the moving review target 403 is in focus. When the system control unit 50 loses sight of the review target 403, the processing advances to a state 416.

The state 416 is a state in which the system control unit 50 loses sight of the review target 403 and focuses on the photographer 401. This state 416 has the same expression as the state 411, and the frame 405 and the icon 409 indicating that the review target 403 is in focus are not displayed.

A state 417 is a state in which the system control unit 50 is unable to detect a review target 406 and focuses on the entire screen with priority given to the closest object. The region that is in focus is a region 407, and at this time, the system control unit 50 does not display a frame indicating that the review target 406 has been detected, but performs an expression 408 indicating that the focus is being adjusted with priority given to the closest object, on the outer periphery of the screen. When the review target 406 moves within the screen, the system control unit 50 advances to a state 418.

The state 418 is a state when the review target 406 moves within the angle of view. At this time, the system control unit 50 updates the region to be focused on in accordance with the movement of the review target 406, but there is no change in the frame expression or the like. When the system control unit 50 loses sight of the review target 406, the processing advances to the state 416.

The transition state in this embodiment has been described above.

Figure 5:
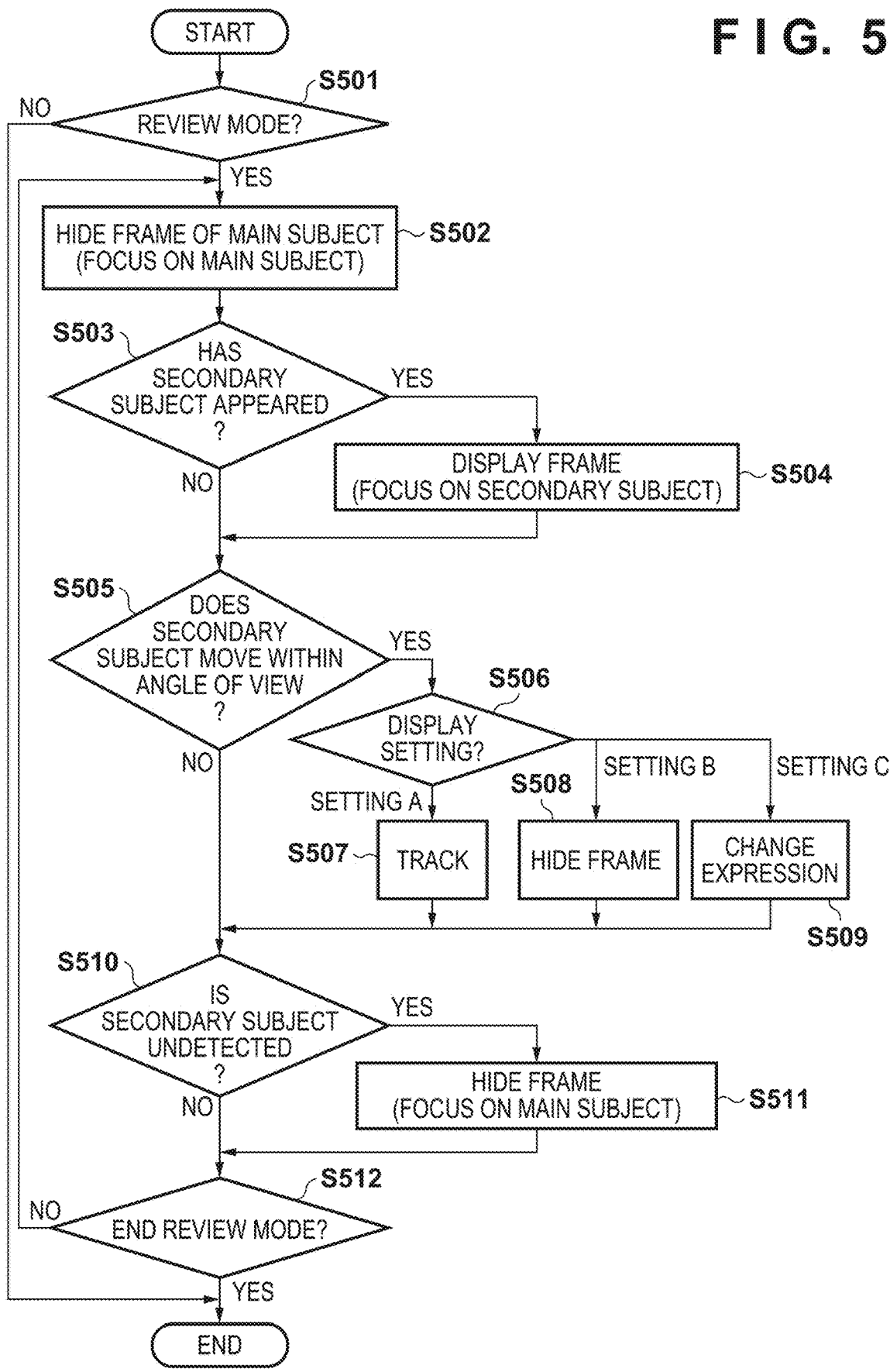
FIG. 5 is a flowchart according to the first embodiment.

Next, the processing content of the system control unit 50 in the embodiment will be described with reference to the flowchart of the first embodiment shown in FIG. 5. Each step is realized by the system control unit 50 loading a program stored in the nonvolatile memory 56 into the system memory 52 and executing it.

In step S501, the system control unit 50 determines whether the currently-set mode is the review mode. If the system control unit 50 determines that it is currently operating in the review mode, it advances the processing to step S502, and if not, it ends this processing.

In step S502, the system control unit 50 hides the frame indicating the photographer. Note that the system control unit 50 hides the frame and continues to focus on the photographer.

In step S503, the system control unit 50 determines whether the secondary subject that is the review target has appeared in the captured image. If the system control unit 50 determines that the review target has appeared in the captured image, the processing advances to step S504, and if not, the processing advances to step S505.

In step S504, the system control unit 50 focuses on the review target and displays a frame on the review target (state 412). Note that if the system control unit 50 cannot recognize the review target but determines that an object other than the photographer has appeared closer than the photographer, the system control unit 50 notifies the user by displaying another frame (state 417).

In step S505, the system control unit 50 determines whether the secondary subject that is the review target has moved within the screen. If the system control unit 50 determines that the review target has moved, the processing advances to step S506, and if the system control unit 50 determines that the review target has not moved, the processing advances to step S510. The system control unit 50 also advances to step S510 when no review target is detected in step S503.

In step S506, the system control unit 50 determines the setting of frame display specifications when the review target moves. The system control unit 50 advances to step S507 if the setting A for tracking the frame also during movement has been set, to step S508 if the setting B for hiding the frame has been set, and to step S509 if the setting C for changing the expression of the frame has been set.

In step S507, the system control unit 50 tracks the frame displayed in S504 according to the review target (state 413).

In step S508, the system control unit 50 hides the frame displayed in step S504 (state 414).

In step S509, the system control unit 50 expresses that the review target is in focus using an expression different from that of the frame displayed in step S504 (state 415).

In step S510, the system control unit 50 determines whether the secondary subject that is the review target has become undetected. If the system control unit 50 determines that the review target has become undetected, the processing advances to step S511, and if the review target remains detected, the processing advances to step S512. The system control unit 50 also proceeds to step S512 when no review target is detected in step S503.

In step S511, the system control unit 50 hides the frame indicating that the review target is in focus and focuses on the photographer.

In step S512, the system control unit 50 determines whether the review mode has ended. The system control unit 50 ends the processing when the review mode ends, and if the review mode continues, performs the processing of step S502 and onward again.

As described above, in this embodiment, as shown in the state transitions and flowcharts based on the first embodiment, a frame is displayed when the review target is in focus in the review mode for reviewing a product, but the frame is not displayed when the photographer is in focus, and thereby comfortable review mode operability can be realized.

Note that when shooting a review, the user shoots and records a video that introduces the product, but when recording a video that introduces a new product, it is natural that an operation for registering the new product as a secondary subject in advance is required. Convenience increases if the product registration operation and the review mode operation are combined into a series of operations. In view of this, when the system control unit 50 determines Yes in step S501, the system control unit 50 may prompt the user to shoot from multiple preset viewpoints in order to correctly recognize the product that is about to be introduced, and then may perform processing for shooting and registration. After performing the registration operation, the system control unit 50 may advance to the processing of step S502 and onward.

Figure 6:
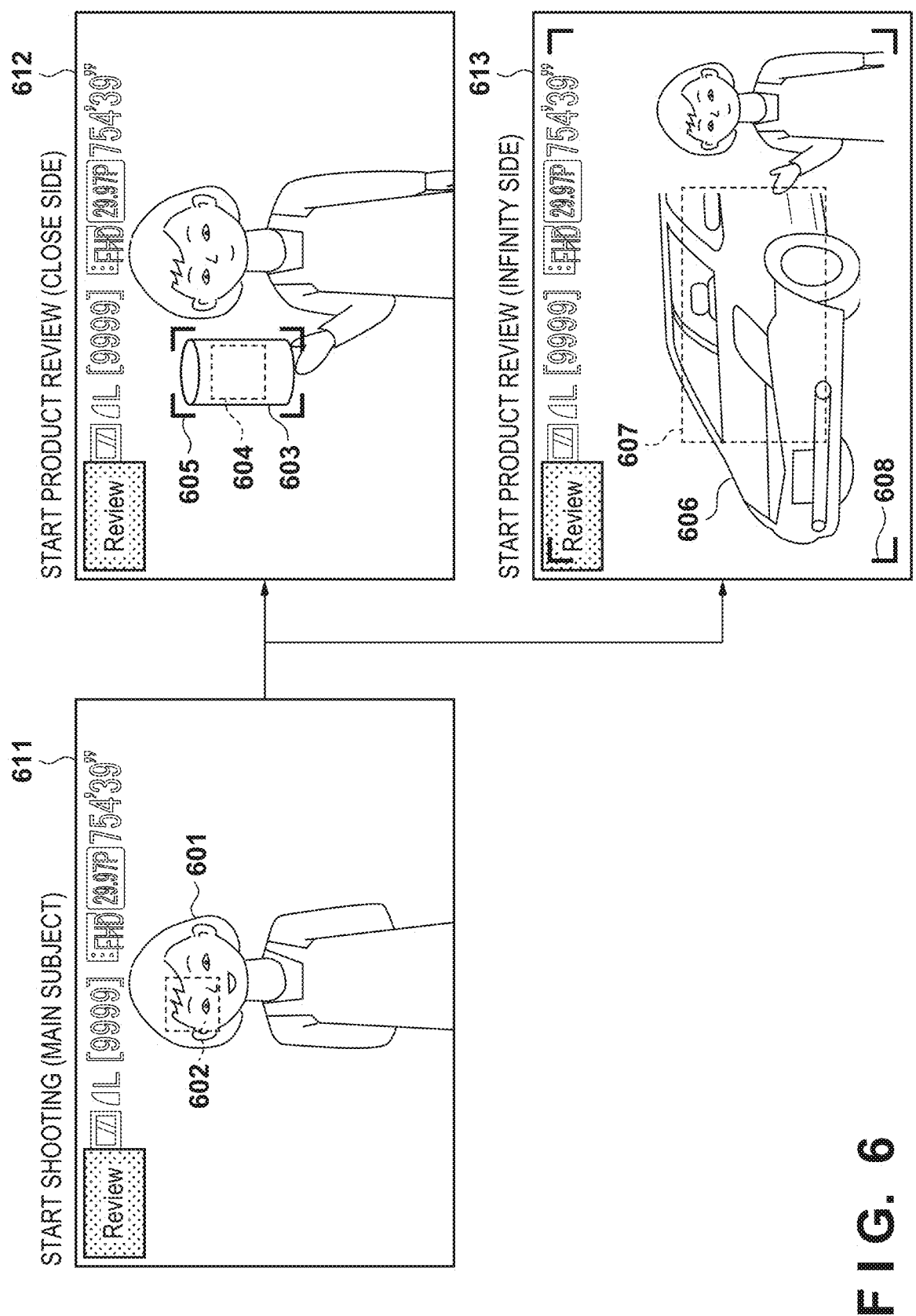
FIG. 6 is a transition diagram of a display screen according to a second embodiment.

FIG. 6 is a diagram showing state transitions in a second embodiment. This will be described using states 611 to 613.

The state 611 is a state in which a photographer 601 is in focus. The system control unit 50 basically continues to focus on the photographer 601 unless anything other than the photographer 601 is detected. At this time, the system control unit 50 focuses on a region 602, and does not display this frame on the screen on the display unit 28. When the review target appears, the system control unit 50 advances to the state 612 or the state 613. At this time, the system control unit 50 switches the focus display based on the relationship in the front-rear direction between the photographer 601 and the review target. For example, as viewed from the digital camera 100, the system control unit 50 advances to the state 612 when the review target is in front of the photographer 601 (close side), and advances to the state 613 when the review target is behind the photographer (infinity side).

The state 612 is a state in which a review target 603 is detected and the review target on the close side relative to the photographer 601, who is the previously-tracked subject, is in focus. At this time, the region to be focused on according to the position of the review target 603 is a region 604, and the system control unit 50 displays a frame 605 indicating the position of the review target 603. When the review target 603 moves within the screen, the system control unit 50 causes a transition similar to the transition from state 413 to state 415 in FIGS. 4A and 4B described above.

The state 613 is a state in which a review target 606 is detected and the review target 606 on the infinity side relative to the photographer 601, who is the previously-tracked subject, is in focus. At this time, the region to be focused on according to the position of the review target 606 is a region 607, and the system control unit 50 displays a frame 608 indicating the position of the review target 606. When the review target 606 moves within the screen, the system control unit 50 causes a transition similar to the transition from the state 413 to the state 415 in FIGS. 4A and 4B described above.

As described above, the system control unit 50 may also change the frame expression depending on whether the review target is on the close side or the infinity side relative to the photographer as viewed from the camera.

Figure 7:
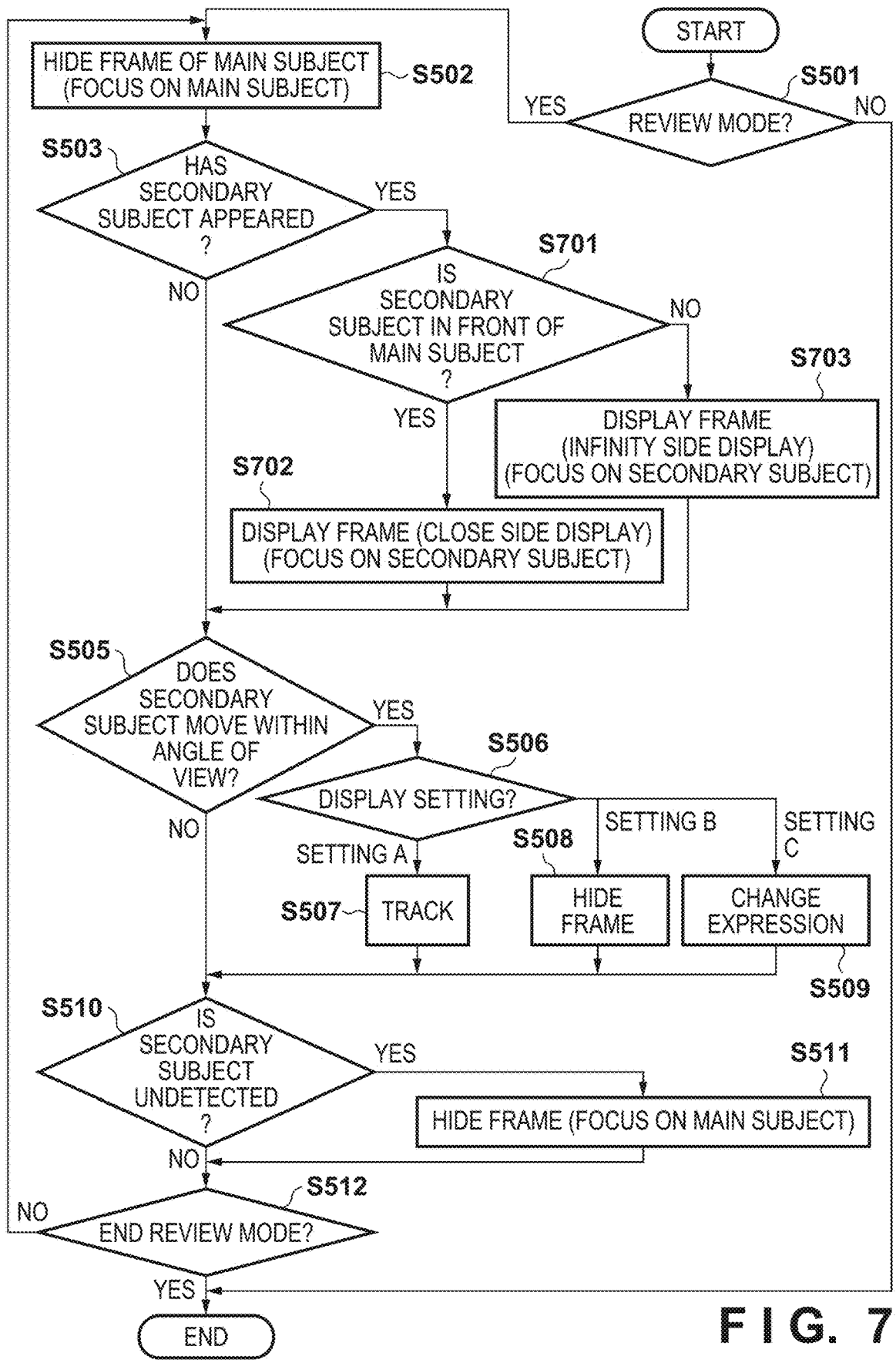
FIG. 7 is a flowchart according to the second embodiment.

FIG. 7 is a flowchart showing the processing of the second embodiment. Each processing is realized by the system control unit 50 loading a program stored in the nonvolatile memory 56 into the system memory 52 and executing it. Regarding the flowcharts below, processing and control are performed by the system control unit 50. Note that steps S501 to S512 are the same as those in FIG. 5, and therefore description thereof is omitted.

In step S701, the system control unit 50 determines the positional relationship between the secondary subject that is the review target and the photographer detected in step S503, and if the secondary subject that is the review target is in front of (on the close side relative to) the photographer, the system control unit 50 advances to step S702, and if the secondary subject that is the review target is behind (on the infinity side relative to) the photographer, the system control unit 50 advances to step S703.

In step S702, the system control unit 50 performs a close-side frame display on the review target (state 612). At this time, the secondary subject that is the review target continues to be focused on.

In step S703, an infinity-side frame display is performed on the review target (state 613). At this time, the secondary subject that is the review target continues to be focused on.

As described above, using the state transitions and flowcharts based on the second embodiment, improved operability is achieved by devising the frame expression in the product review mode.

Figure 8:
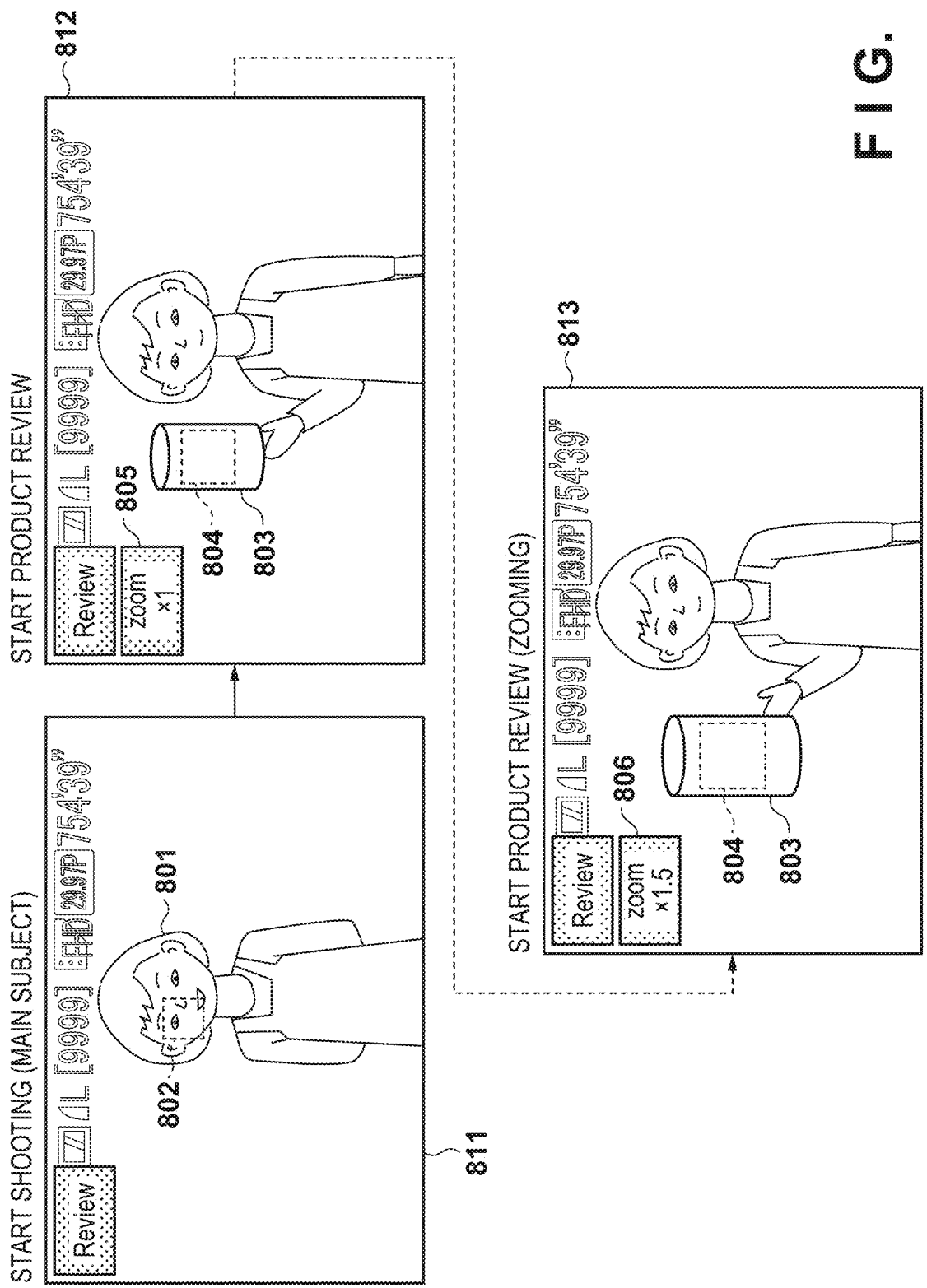
FIG. 8 is a transition diagram of a display screen according to a third embodiment.

FIG. 8 is a diagram showing state transitions in a third embodiment. This will be described using states 811 to 813 shown in FIG. 8.

In the state 811, a photographer 801 is in focus. If nothing is detected other than the photographer 801, the system control unit 50 basically continues to focus on the photographer 801. The region in focus at this time is a region 802, and the system control unit 50 does not display a frame on the screen on the display unit 28. The system control unit 50 advances to the state 812 when a review target appears.

The state 812 is a state in which a review target 803 is detected and the review target 803 is in focus. At this time, the region to be focused on according to the position of the review target 803 is a region 804. The difference from the first embodiment and the second embodiment is that the system control unit 50 notifies the user that the review target 803 is in focus using a unit other than frame expression. The state 812 is the moment when the system control unit 50 detects the review target 803, and has the same angle of view as the state 811 (display 805).

A state 813 is a state when a predetermined amount of time has elapsed since the review target 803 was detected. At this time, the region to be focused on according to the position of the review target 803 is a region 804. When the system control unit 50 detects the review target 803, it gradually executes zoom processing toward the review target 803 (display 806). By doing so, the photographer can check that the review target 803 is in focus without checking the frame expression. Although this drawing shows an example in which the system control unit 50 performs zooming in the magnification direction, the system control unit 50 may also perform zooming in the scaling-down direction depending on the size of the secondary subject that is the review target 803.

As described above, when the system control unit 50 detects the review target and focuses on the review target, the system control unit 50 automatically performs a zoom operation of the camera according to the review target and notifies the photographer that the review target is in focus.

Figure 9:
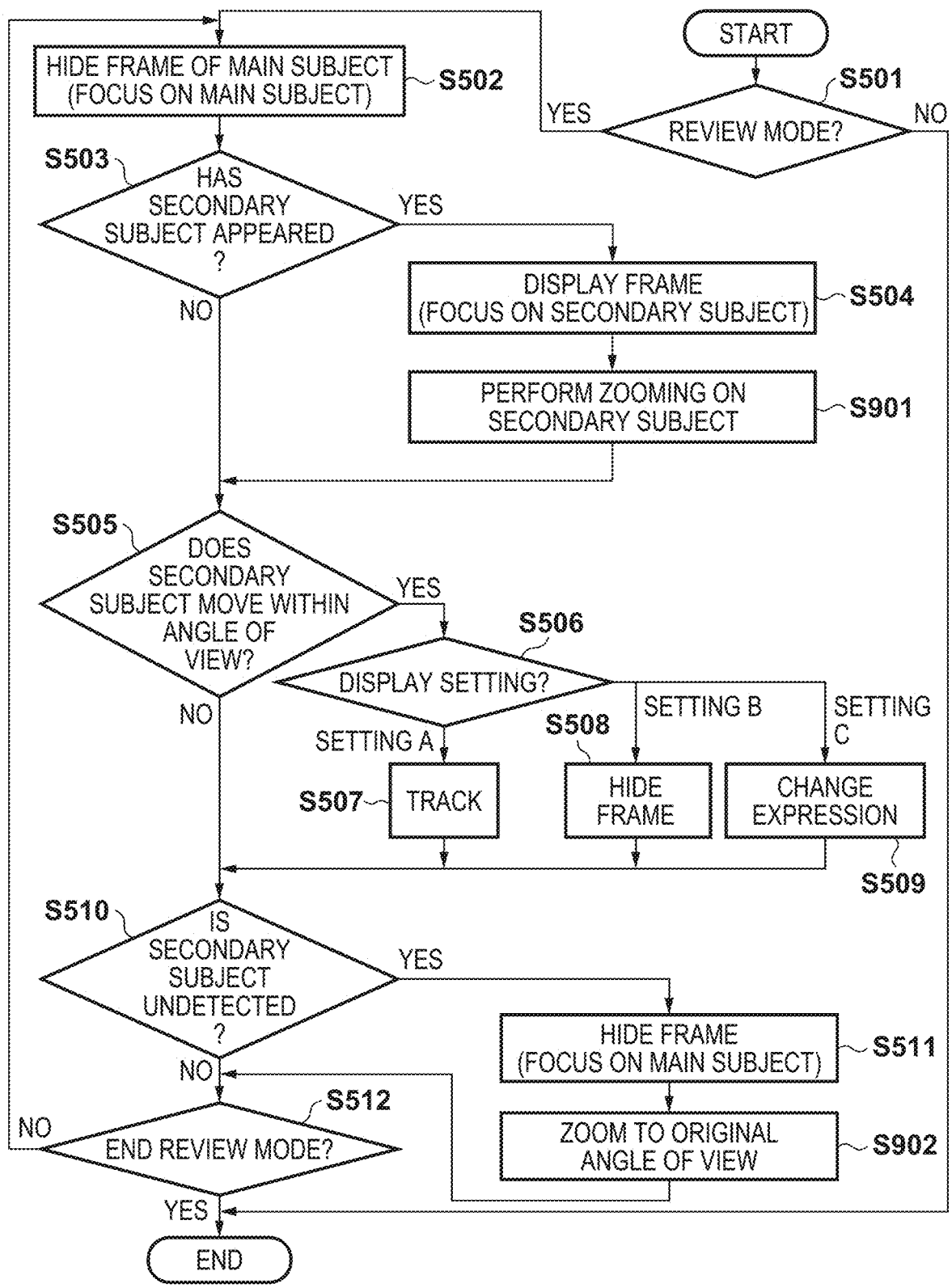
FIG. 9 is a flowchart according to the third embodiment.

FIG. 9 is a flowchart showing the processing of the third embodiment. Each processing is realized by the system control unit 50 loading a program stored in the nonvolatile memory 56 into the system memory 52 and executing it. Regarding the flowcharts below, processing and control are performed by the system control unit 50. Note that steps S501 to S512 are the same as those in FIG. 5, and therefore description thereof is omitted.

In step S901, the system control unit 50 performs zooming on the secondary subject that is the review target detected in step S503. The system control unit 50 performs zooming in an optimal direction (magnification/scaling-down) such that the review target falls within the angle of view. Also, the system control unit 50 may improve the quality of the moving image due to the user setting the direction in advance.

In step S902, the system control unit 50 zooms to the original angle of view, contrary to the zooming in step S901. At this time, the system control unit 50 may also perform control such that zooming is performed on the photographer.

As described above, using the state transitions and flowcharts based on the third embodiment, the system control unit 50 realizes improved operability by devising the frame expression in the product review mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-086425, filed May 25, 2023, which is hereby incorporated by reference herein in its entirety.

What is claimed is:
1. An image capture apparatus comprising:
at least one processor and/or circuit configured to function as the following units:
a recognition unit configured to recognize a person as a main subject and an object that is not a person as a secondary subject from an image obtained by an image capture unit configured to capture an image of a subject; and a control unit configured to control a display unit configured to display the image captured by the image capture unit, according to a result of recognition performed by the recognition unit, wherein in a case where a first mode is selected, the control unit displays, on the display unit, an image in which a focus display indicating a focus target is composited on the image obtained by the image capture unit, regardless of which of the main subject and the secondary subject is in focus, and in a case where a second mode is selected, the control unit displays, on the display unit, an image in which the focus display is not composited in a case where the main subject is in focus and in which the focus display is composited in a case where the secondary subject is in focus.

2. The image capture apparatus according to claim 1, wherein in a case where the secondary subject is moving, the control unit does not composite the focus display.

3. The image capture apparatus according to claim 1, wherein while the secondary subject is still, the control unit displays, on the display unit, an image in which a first focus display is composited, and while the secondary subject is moving, the control unit displays, on the display unit, an image in which a second focus display that is different from the first focus display is composited.

4. The image capture apparatus according to claim 1, the control unit switches the focus display based on a relationship in a front-rear direction between the main subject and the secondary subject.

5. The image capture apparatus according to claim 4, wherein the focus display is a frame, and in a case where the secondary subject is located on a far side relative to the main subject, the control unit displays the focus display with the frame that is larger than the frame in a case where the secondary subject is located on a near side relative to the main subject.

6. The image capture apparatus according to claim 1, wherein in a case where the secondary subject is in focus, the control unit displays, on the display unit, an image obtained by performing zooming on the secondary subject as the focus display.

7. A control method for an image capture apparatus, comprising:

recognizing a person as a main subject and an object that is not a person as a secondary subject from an image obtained by an image capture unit configured to capture an image of a subject; and controlling a display unit configured to display the image captured by the image capture unit, according to a result of recognition performed in the recognition, wherein in the controlling, in a case where a first mode is selected, an image in which a focus display indicating a focus target is composited on the image obtained by the image capture unit is displayed on the display unit, regardless of which of the main subject and the secondary subject is in focus, and in a case where a second mode is selected, an image in which the focus display is not composited in a case where the main subject is in focus and in which the focus display is composited in a case where the secondary subject is in focus is displayed on the display unit.

8. A non-transitory computer-readable storage medium storing a computer program that, due to being read out and executed by a computer of an image capture apparatus, causes the computer to:

recognize a person as a main subject and an object that is not a person as a secondary subject from an image obtained by an image capture unit configured to capture an image of a subject; and control a display unit configured to display the image captured by the image capture unit, according to a result of recognition performed in the recognition, wherein in the control of the display unit, in a case where a first mode is selected, an image in which a focus display indicating a focus target is composited on the image obtained by the image capture unit is displayed on the display unit, regardless of which of the main subject and the secondary subject is in focus, and in a case where a second mode is selected, an image in which the focus display is not composited in a case where the main subject is in focus and in which the focus display is composited in a case where the secondary subject is in focus is displayed on the display unit.

* * * * *